United States Patent
Switzer et al.

(10) Patent No.: US 8,884,920 B1
(45) Date of Patent: Nov. 11, 2014

(54) PROGRAMMATIC SENSING OF CAPACITIVE SENSORS

(75) Inventors: Roger N. Switzer, Vancouver, WA (US); Jerry A. Marshall, Jr., Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 66 days.

(21) Appl. No.: 13/477,664

(22) Filed: May 22, 2012

Related U.S. Application Data

(60) Provisional application No. 61/489,979, filed on May 25, 2011.

(51) Int. Cl.
*G06F 3/044* (2006.01)

(52) U.S. Cl.
USPC ........................................................ 345/174

(58) Field of Classification Search
CPC ... G06F 3/03547; G06F 3/041; G06F 3/0412; G06F 3/0416; G06F 3/044; G06F 3/0488–3/04886
USPC .......... 178/18.06, 18.01, 18.03; 345/173–178
See application file for complete search history.

(56) References Cited

U.S. PATENT DOCUMENTS

| | | | |
|---|---|---|---|
| 5,535,397 A | 7/1996 | Durante et al. | |
| 5,649,135 A | 7/1997 | Pechanek et al. | |
| 5,768,500 A | 6/1998 | Agrawal et al. | |
| 5,778,070 A | 7/1998 | Mattison | |
| 5,933,627 A | 8/1999 | Parady | |
| 5,943,493 A | 8/1999 | Teich et al. | |
| 6,018,759 A | 1/2000 | Doing et al. | |
| 6,151,668 A | 11/2000 | Pechanek et al. | |
| 6,446,191 B1 | 9/2002 | Pechanek et al. | |
| 6,615,355 B2 | 9/2003 | Mattison | |
| 7,203,821 B2 | 4/2007 | Thimmannagari | |
| 7,249,246 B1 | 7/2007 | Banning et al. | |
| 7,315,956 B2 | 1/2008 | Jensen et al. | |
| 7,334,086 B2 | 2/2008 | Hass et al. | |
| 7,598,752 B2 * | 10/2009 | Li | 345/173 |
| 7,647,473 B2 | 1/2010 | Kamigaga et al. | |
| 7,765,342 B2 | 7/2010 | Whalley et al. | |
| RE41,703 E | 9/2010 | Pechanek et al. | |
| 7,818,542 B2 | 10/2010 | Shen et al. | |
| 8,095,775 B1 | 1/2012 | Khan | |
| 2002/0161986 A1 | 10/2002 | Kamigata et al. | |
| 2005/0050542 A1 | 3/2005 | Davis et al. | |
| 2007/0136561 A1 | 6/2007 | Whalley et al. | |
| 2007/0262962 A1 * | 11/2007 | XiaoPing et al. | 345/173 |

(Continued)

OTHER PUBLICATIONS

"Final Office Action", U.S. Appl. No. 12/254,506, (Oct. 13, 2011), 26 pages.

(Continued)

*Primary Examiner* — Nathan Danielsen

(57) ABSTRACT

The present disclosure describes apparatuses and techniques for programmatic sensing of capacitive sensors. In some aspects, a first set of instructions are executed that drive an output to a predetermined state for a duration of time effective to charge a capacitive sense element, a second set of instructions are executed that monitor a voltage level of the capacitive sense element, the second set of instructions executed for a number of iterations until the voltage level of the capacitive sense element crosses a predefined threshold, and user interaction with the capacitive sense element is determined based on the number of iterations that the second set of instructions execute.

20 Claims, 6 Drawing Sheets

(56) References Cited

U.S. PATENT DOCUMENTS

| | | | |
|---|---|---|---|
| 2009/0019257 | A1 | 1/2009 | Shen et al. |
| 2009/0315258 | A1* | 12/2009 | Wallace et al. ............... 273/238 |
| 2009/0318229 | A1* | 12/2009 | Zielinski et al. ............. 345/174 |
| 2010/0199288 | A1 | 8/2010 | Kalman |
| 2010/0282525 | A1* | 11/2010 | Stewart ..................... 178/18.06 |

OTHER PUBLICATIONS

"Final Office Action", U.S. Appl. No. 12/356,761, (Jun. 3, 2011), 10 pages.

"Non-Final Office Action", U.S. Appl. No. 12/254,506, (Apr. 26, 2011), 18 pages.

"Non-Final Office Action", U.S. Appl. No. 12/274,235, (Mar. 17, 2011), 11 pages.

"Non-Final Office Action", U.S. Appl. No. 12/356,761, (Feb. 25, 2011), 8 pages.

"Notice of Allowance", U.S. Appl. No. 12/274,235, (Sep. 16, 2011), 6 pages.

Balakrishnan, Saisanthosh et al., "The Impact of Performance Asymmetry in Emerging Multicorfe Architectures", *In Proceedings of ISCA 2005*, (2005),12 pages.

Kumar, Rakesh et al., "A Multi-Core Approach to Addressing the Energy-Complexity Problem in Microprocessors", *In Proceedings of WCED 2003*, (Jun. 2003), pp. 1-8.

Kumar, Rakesh et al., "Single-ISA Heterogeneous Multi-Core Architectures: The Potential for Processor Power Reduction", *In Proceedings of MICRO-36 2003*, (2003), 12 pages.

"Non-Final Office Action", U.S. Appl. No. 12/356,761, Dec. 24, 2013, 11 pages.

Constantinou, et al.,' "Performance Implications of Single Thread Migration on a Chip Multi-Core", ACM SIGARCH Computer Architecture News, vol. 33 Issue 4, Nov. 2005, 12 pages.

"Calling convention", Retrieved from <http://en.wikipedia.org/w/index.php?title=Calling_convention&oldid=162306164> on Apr. 15, 2014, Oct. 4, 2007, 2 pages.

"Final Office Action", U.S. Appl. No. 12/356,761, May 1, 2014, 6 pages.

"Non-Final Office Action", U.S. Appl. No. 12/254,506, Apr. 24, 2014, 18 pages.

"X86 Disassembly/Functions and Stack Frames", Retrieved from <http://en.wikibooks.org/w/index.php?title=X86_Disassembly/Functions_and_Stack_Frames&oldid=840982> on Apr. 13, 2014, Apr. 23, 2007, 5 pages.

Magnusson, "Understanding stacks and registers in the Sparc architecture(s)", Retrieved from <http://web.archive.org/web/20071020054930/http://www.sics.se/~psm/sparcstack.html> on Apr. 15, 2014, Mar. 1997, 9 pages.

"Advisory Action", U.S. Appl. No. 12/356,761, Aug. 8, 2014, 3 pages.

"Coding Laboratory—I2C on an AVR using bit banging", Retrieved from <http://codinglab.blogspot.com/2008/10/i2c-on-avr-using-bit-banging.html> on Sep. 22, 2014, Oct. 14, 2008, 5 pages.

"Non-Final Office Action", U.S. Appl. No. 13/013,274, Sep. 19, 2014, 20 pages.

"Restriction Requirement", U.S. Appl. No. 12/356,761, Sep. 4, 2014, 5 pages.

\* cited by examiner

PROGRAMMATIC SENSING OF CAPACITIVE SENSORS

RELATED APPLICATIONS

This present disclosure claims priority to U.S. Provisional Patent Application Ser. No. 61/489,979 filed May 25, 2011, the disclosure of which is incorporated by reference herein in its entirety. This present disclosure is also related to U.S. patent application Ser. No. 13/013,274 filed Jan. 25, 2011, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Users often interact with or control computing and electronic devices through touch input. These devices typically rely on tactile sensors to receive touch input from users. By monitoring a tactile sensor, touch input can be detected when a user touches or otherwise interacts with the tactile sensor. Each tactile sensor of a device, however, may require excitation to enable touch input to be sensed or detected. This excitation is often provided by a set of active components associated with each tactile sensor. These active components can be expensive and consume valuable circuit board space, increasing a cost and space requirement associated with each tactile sensor of a device.

Additionally, the functionality to monitor a tactile sensor is typically offloaded from a main processing entity of a device to off-chip special purpose hardware designed by a third party. Touch input received from the tactile sensor is processed by this special purpose hardware and relayed to the main processing entity. Integrating the special purpose hardware into a device, though, may require development and testing of an additional communication interface to enable communication with the special purpose hardware. This development and testing of an additional communication interface during device development can consume valuable time and resources resulting in increased design costs.

SUMMARY

This summary is provided to introduce subject matter that is further described below in the Detailed Description and Drawings. Accordingly, this Summary should not be considered to describe essential features nor used to limit the scope of the claimed subject matter.

A method is described for executing a first set of instructions that drive an output to a predetermined state for a duration of time effective to charge a capacitive sense element, executing, subsequent to the output being driven for the duration of time, a second set of instructions that monitor, via an input, a voltage level of the capacitive sense element as the charge on the capacitive sense element changes, wherein the second set of instructions are executed for a number of iterations until the voltage level of the capacitive sense element crosses a predefined threshold, and determining, based on the number of iterations that the second set of instructions execute until the voltage level of the capacitive sense element crosses the predefined threshold, whether a user is interacting with the capacitive sense element.

Another method is described for executing a first set of instructions to drive an output high effective to charge a capacitive switch, executing, while the capacitive switch discharges, a second set of instructions monitoring a voltage level of the capacitive switch, the second set of instructions executed for a number of iterations until the voltage level of the capacitive switch crosses a threshold, and registering user interaction with the capacitive switch responsive to the number of iterations that the second set of instructions execute being equal to or greater than a reference value, or registering no user interaction with the capacitive switch responsive to the number of iterations that the second set of instructions execute not being greater than the reference value.

A System-on-Chip is described that is configured to execute a first set of instructions that drive an output port to a predetermined state for a duration of time effective to charge a capacitive sense element, execute, subsequent to the output port being driven for the duration of time, a second set of instructions that monitor, via an input port, a voltage level of the capacitive sense element as the charge on the capacitive sense element changes, wherein the second set of instructions are executed for a number of iterations until the voltage level of the capacitive sense element crosses a predefined threshold, and determine, based on the number of iterations that the second set of instructions execute until the voltage level of the capacitive sense element crosses the predefined threshold, whether a user is interacting with the capacitive sense element.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical elements.

DETAILED DESCRIPTION

Conventional techniques and apparatuses for sensing touch input can be expensive and complex to design. Active components and special purpose hardware associated with conventionally-implemented tactile sensors are expensive, consume board space, or increase design complexity, resulting in added development and production costs. This disclosure describes apparatuses and techniques for programmatic sensing of capacitive sensors that allow capacitive sensors to be implemented without active circuitry and sensed without the use of special purpose hardware. By so doing, design and production costs associated with a touch input-enabled device can be reduced.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
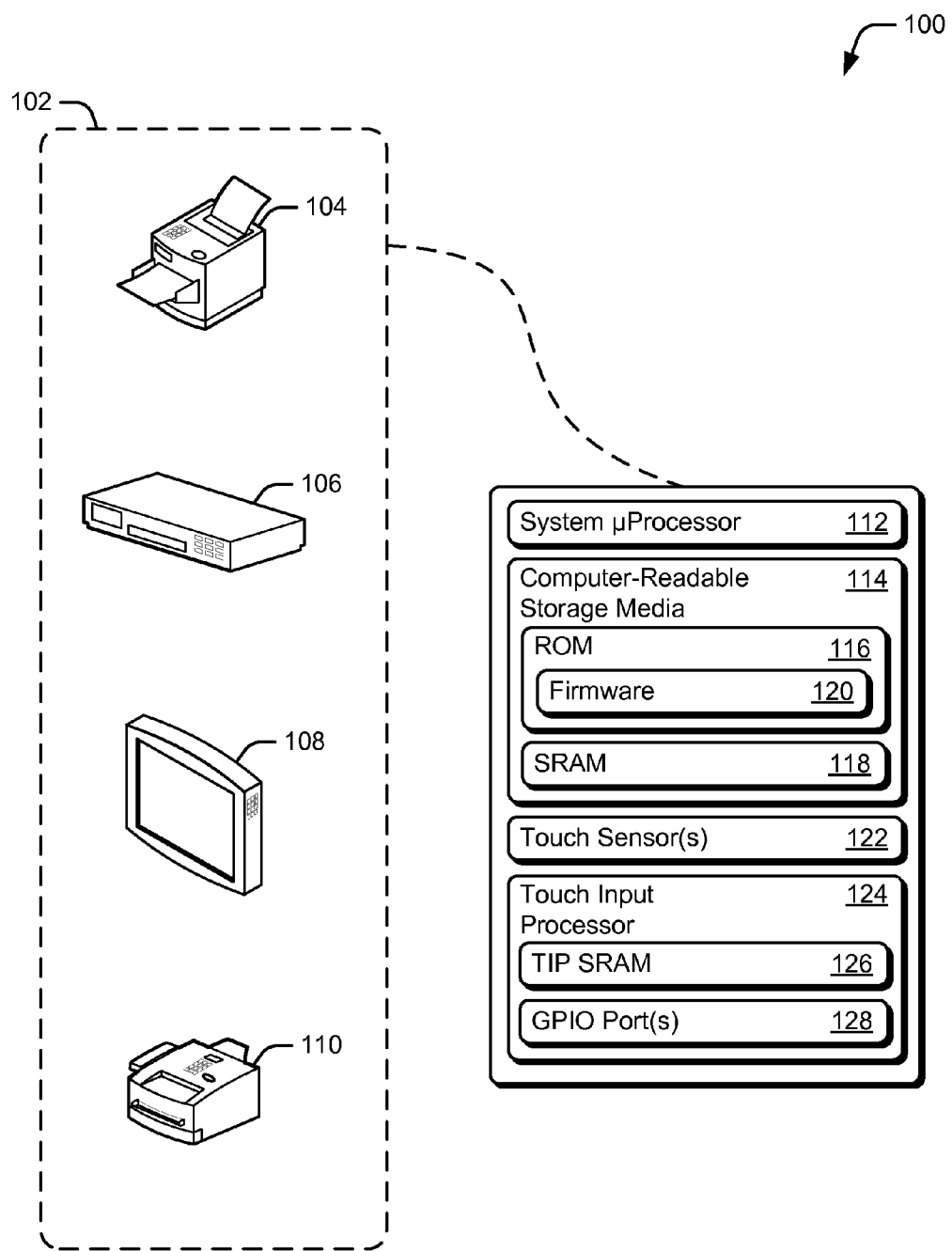
FIG. 1 illustrates an operating environment having touch-input-enabled devices in accordance with one or more aspects.

FIG. 1 illustrates an example operating environment 100 having touch input-enabled devices 102, each of which are capable of receiving and/or responding to touch input received from a user (e.g., button presses, slider control movement, soft-key presses, soft-dial manipulation, and so on). Touch input-enabled devices 102 include multi-function printer 104, set-top box 106, Internet-protocol-enabled television 108 (IP TV 108), and photo printer 110. Although not shown, other configurations of touch input-enabled devices 102 are also contemplated such as a desktop computer, server, tablet computer, microwave, refrigerator, laundry appliance, mobile-internet device (MID), mobile gaming console, mobile hotspot, access point, human-input devices, and so on. Touch input-enabled devices 102 are capable of performing various tasks, executing various functions, and/or accepting input values responsive to receiving touch input from a user. For instance, photo printer 110 may print a series of photos from a memory card responsive to a series of touch input (e.g., button presses) received from a user.

Each touch input-enabled device 102 includes a system-level microprocessor 112 (system μprocessor 112) and computer-readable storage media 114. System μprocessor 112 can be any suitable type of processor for executing instructions associated with various functions, activities, or tasks performed by a touch input-enabled device 102. Computer-readable storage media 114 may include any type and/or combination of suitable memory devices, such as read-only memory (ROM) 116 and static random-access memory (SRAM) 118. ROM 116 may include mask-programmable ROM (MROM) or Flash memory.

ROM 116 includes firmware 120, which is executed by system μprocessor 112 to perform various functions, activities, or tasks associated with a touch input-enabled device 102. Variables of firmware 120 and data stacks related to executing firmware 120 can be written to and/or read from SRAM 118. In some cases, system μprocessor 112 is integrated with ROM 116 and/or SRAM 118 as a system-level ASIC, System-on-Chip (SoC), or an Application-Specific Standard Product (ASSP).

Touch input-enabled devices 102 also each include touch sensor(s) 122 and touch input processor 124, which enable sensing or detection of touch input. Although not shown, touch input-enabled devices 102 may also include other tactile switches or sensors to provide additional input functionalities. A touch input-enabled device 102 may support any number or combination of touch sensors 122. How touch sensors are implemented and used varies and is described below.

Touch input processor 124 includes touch input processor SRAM 126 (TIP SRAM 126) and general purpose input/output port(s) 128 (GPIO port(s) 128). TIP SRAM 126 contains microcode or instructions that are executable to, among other things, monitor touch sensors 122 and sense touch input. TIP SRAM 126 may also contain a command queue to receive commands from system μprocessor 112. Contents of SRAM 118 may be manipulated and/or transferred to, or from, TIP SRAM 126 by either system μprocessor 112 or touch input processor 124.

Microcode stored in TIP SRAM 126 may be based on a time-based instruction set that allows configuration, driving, or sensing of GPIO ports 128 to be deterministically programmed. Collections of time-based instructions can be executed with precise timing, such that iterative loops of time-based instructions execute in or about a same amount of time. These time-based instructions may also include a delay value that delays execution of an instruction or a subsequent instruction. By delaying execution of an instruction, or a subsequent instruction, timing of subroutines and use of GPIO ports 128 can be precisely controlled.

Each GPIO port 128 is configurable to be an input port or an output port for touch input processor 124. Configured as an input port, GPIO port 128 is useful to sense a voltage level or other signals. Additionally, when configured as an input port, GPIO port 128 may present a high impedance state (e.g., high-Z state) to an operably coupled signal line. Alternately, configured as an output port, GPIO port 128 can be driven to logic-level high or low states (e.g., 5 volts, 3.3 volts, 0 volts, and so on) to drive or sink current respectively. In some cases, each GPIO port 128 is individually configured and controlled by executing microcode from TIP SRAM 126.

Touch input processor 124 allows user interaction with touch sensors 122 to be sensed or detected. Generally, touch input processor 124 monitors electrical characteristics of touch sensors 122 to sense or detect touch input received from a user. Touch input processor may also be configured to perform other functions, such as communicate with other application-specific integrated-circuits (ASICs) of a touch input-enabled device 102. By way of example, touch input processor 124 may be implemented as a serial control channel processor, having functions and structure thereof, to communicate with and/or control other ASICs of a touch input-enabled device 102. How touch input processor 124 is implemented and used varies and is described below.

Figure 2:
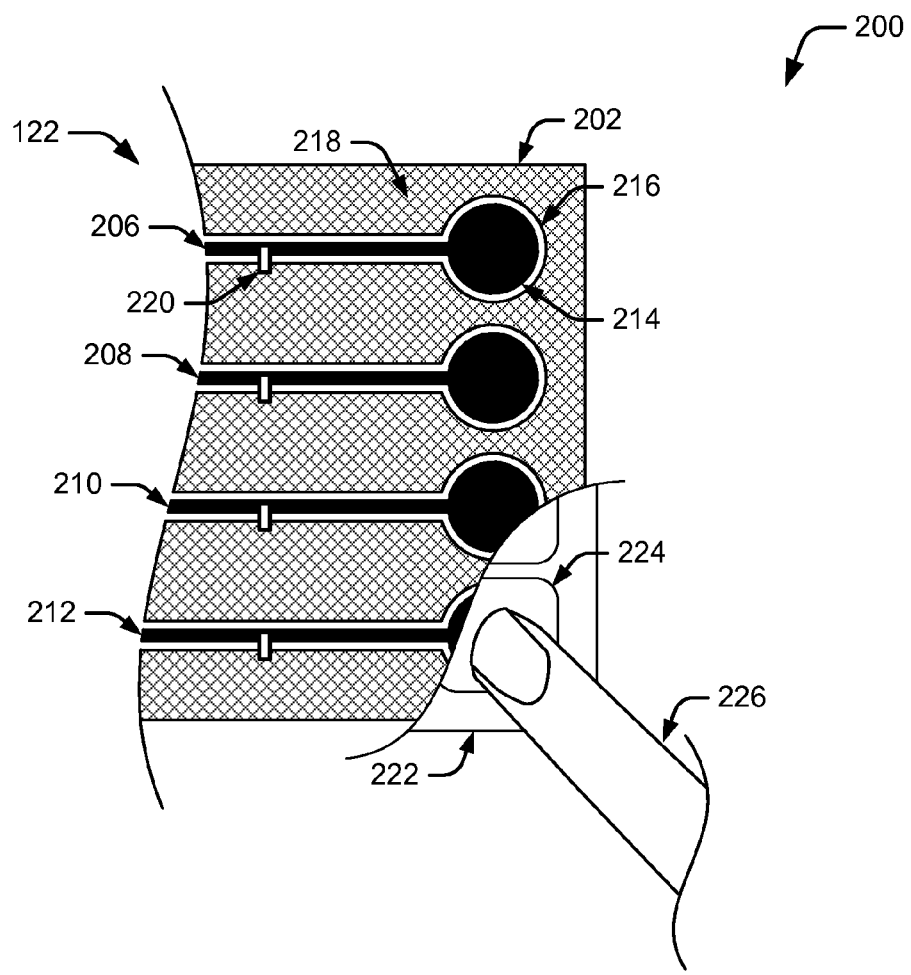
FIG. 2 illustrates a detailed aspect of an example touch sensor shown in FIG. 1.
Figure 2:
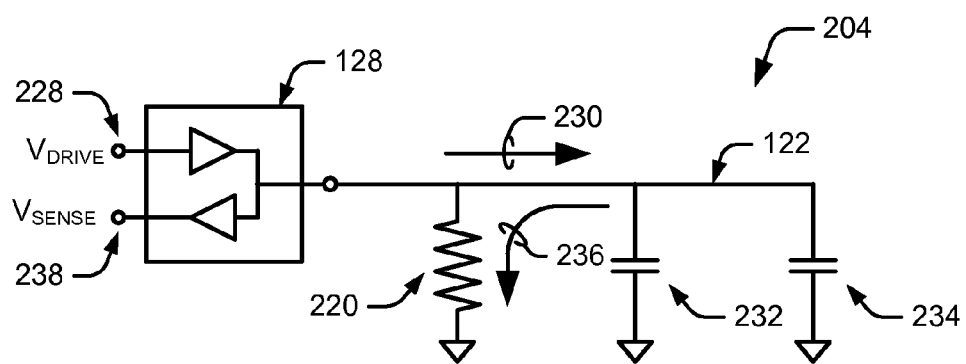

FIG. 2 illustrates a detailed example of touch sensors 122 at 200, including example printed circuit assembly 202 (PCA 202). FIG. 2 also illustrates an example schematic diagram of a touch sensor 122 at 204. In this particular example, PCA 202 includes capacitive sense elements 206, 208, 210, and 212 formed by a conductor pattern etched on a printed circuit board. Each capacitive sense element 206-212 includes a switch area 214 surrounded by a keep out area 216 that separates switch area 214 from ground plane 218 (duplicate references to like elements of capacitive sense elements 208-212 omitted here for brevity and visual clarity). Generally, switch area 214 and ground plane 218 of capacitive sense element 206 form a capacitor (e.g., capacitive switch electrode) capable of storing an electrical charge.

Each capacitive sense element 206-212 also includes discharge resistor 220, through which an electrical charge may discharge. To limit an amount of discharge current, discharge resistor 220 may have a high value such as greater than 1 Mega Ohm. Although shown as a single layer of a printed circuit board, features or components of PCA 202 may be implemented on any number of circuit layers, in any suitable combination of layout, placement, and/or layering. For example, another ground plane 218 may be located below switch area 214 or signal traces of capacitive sense elements 206-212 may be routed on a layer different from a layer supporting switch area 214.

Alternately or additionally, a capacitive sense element may include a charge resistor (not shown), through which current may flow to charge the capacitive sense element. For example, a charge resistor connected to a supply voltage (e.g., 3.3 volts or 5 volts) can be used to charge the capacitive sense element to a higher potential level, up to and including the level of the supply voltage.

PCA 202 may also feature overlay 222, which may be formed from polyester, polyamide material, glass, or other dielectric material. A thickness of overlay 222 may vary from 3 mils to 25 mils depending on environmental conditions in which a touch input-enabled device 102 may be deployed or electrical characteristics of capacitive sense elements 206-212 and/or overlay 222. Overlay 222 may also include button graphic 224 for each touch sensor 122. Button graphic 224 can display any suitable text, symbol, or image to convey a purpose or function associated with a particular touch sensor 122. Button graphic 224 is useful to guide finger 226 of a user proximate a switch area of capacitive sense elements 206-212.

FIG. 2 also illustrates an example schematic diagram of a touch sensor 122 at 204. This example schematic also includes GPIO port 128, which is shown here as a tri-state buffer. GPIO port 128 may provide drive voltage 228 ($V_{DRIVE}$ 228) when configured as an output. This drive voltage may be a logic-level voltage, such as 3.3 volts or 5 volts referenced to ground. When connected to touch sensor 122, $V_{DRIVE}$ 228 may cause charge current 230 to flow into capacitive elements touch sensor 122. Here, this is illustrated as charge current 230 flowing into capacitive elements 232 and 234. In this example schematic, capacitive element 232 represents capacitance between switch area 214 and ground plane 218. Capacitive element 234 represents fringing capacitance introduced or altered by finger 226 when proximate switch area 214.

GPIO port 128 may also be configured as a high impedance input to sense a voltage of touch sensor 122 ($V_{SENSE}$ 238). When connected to touch sensor 122, GPIO port 128 may sense a voltage level of touch sensor 122 as discharge current 236 flows through discharge resistor 220. In some cases, discharge current 236 may also discharge partially back through GPIO port 128. Although illustrated here as a combined input/output port, GPIO port 128 may alternately be implemented as a separate input and a separate output.

Additionally or alternatively, GPIO port 128 may be used to discharge the capacitive sense element (e.g., a current sink). Once the capacitive sense element is discharged, GPIO 128 can then be configured to a high impedance state for monitoring voltage of the capacitive sense element while current flows from a charging resistor connected to a supply voltage. Thus in this particular aspect, GPIO 128 monitors the increasing voltage of the capacitive sense element as current flows from a charging resistor.

Techniques of Programmatic Sensing of Capacitive Sensors

The following discussion describes techniques of programmatic sensing of capacitive sensors. These techniques can be implemented using the previously described environment, such as touch input processor 124 of FIG. 1 embodied on a touch input-enabled device 102. These techniques include methods illustrated in FIGS. 3 and 5, each of which is shown as a set of operations performed by one or more entities. These methods are not necessarily limited to the orders shown for performing the operations. Further, these methods may be used in conjunction with one another whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
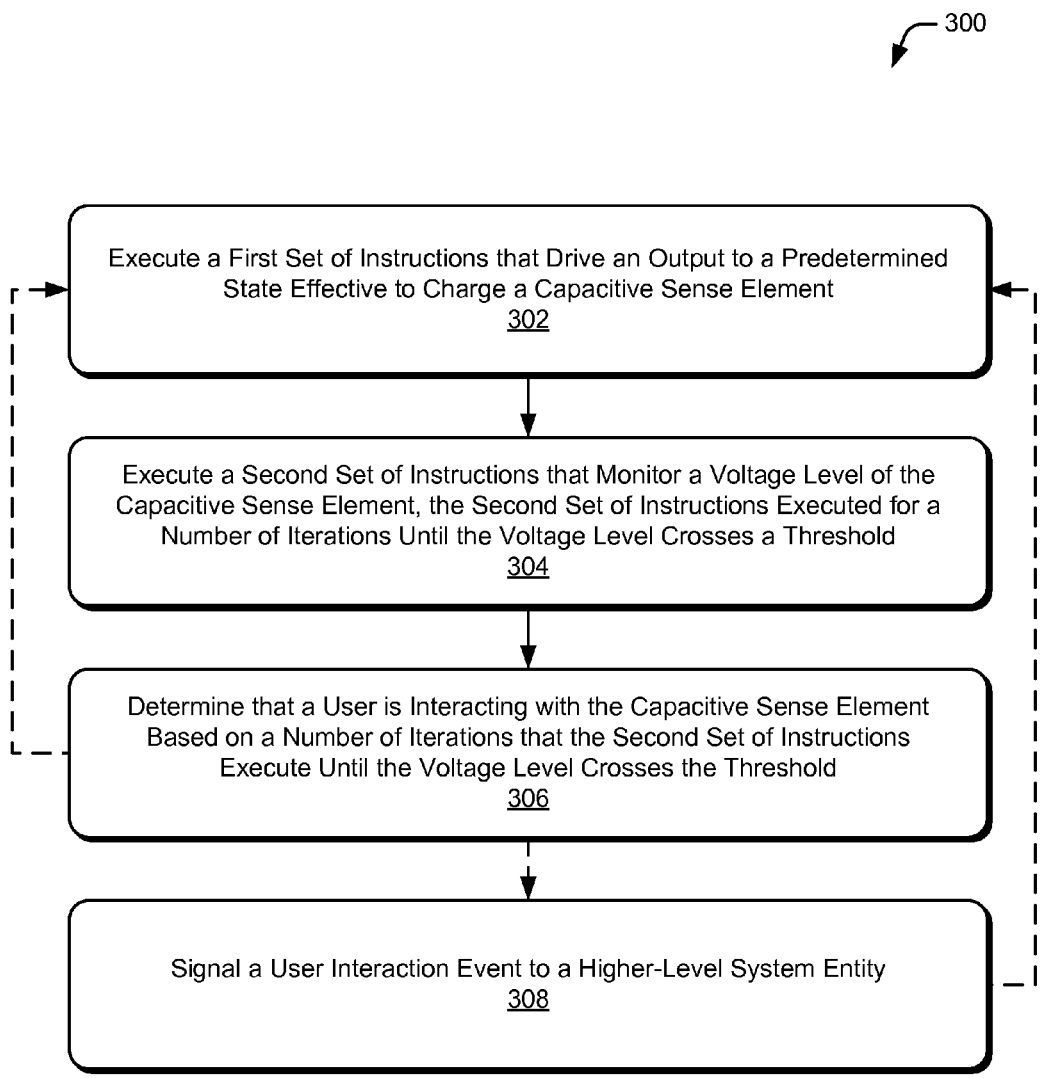
FIG. 3 illustrates a method of determining user interaction with a capacitive sense element.

FIG. 3 depicts a method 300 for determining user interaction with a capacitive sense element, including operations performed by touch input processor 124 of FIG. 1.

At 302, a first set of instructions that drive an output to a predetermined state for a duration of time are executed effective to charge a capacitive sense element. The predetermined state may be a logic-level high for the output port. This first set of instructions may include a time-based instruction that delays execution of a subsequent instruction. The time-based instruction may have a timing parameter defining an amount of time for which execution of the subsequent execution is delayed. In some cases, the output may be a GPIO port that is configured as an output. In such cases, executing the first set of instructions may configure the GPIO port as an output. Alternately or additionally, executing the first set of instructions may configure the GPIO port as an input after the duration of time.

Figure 4:
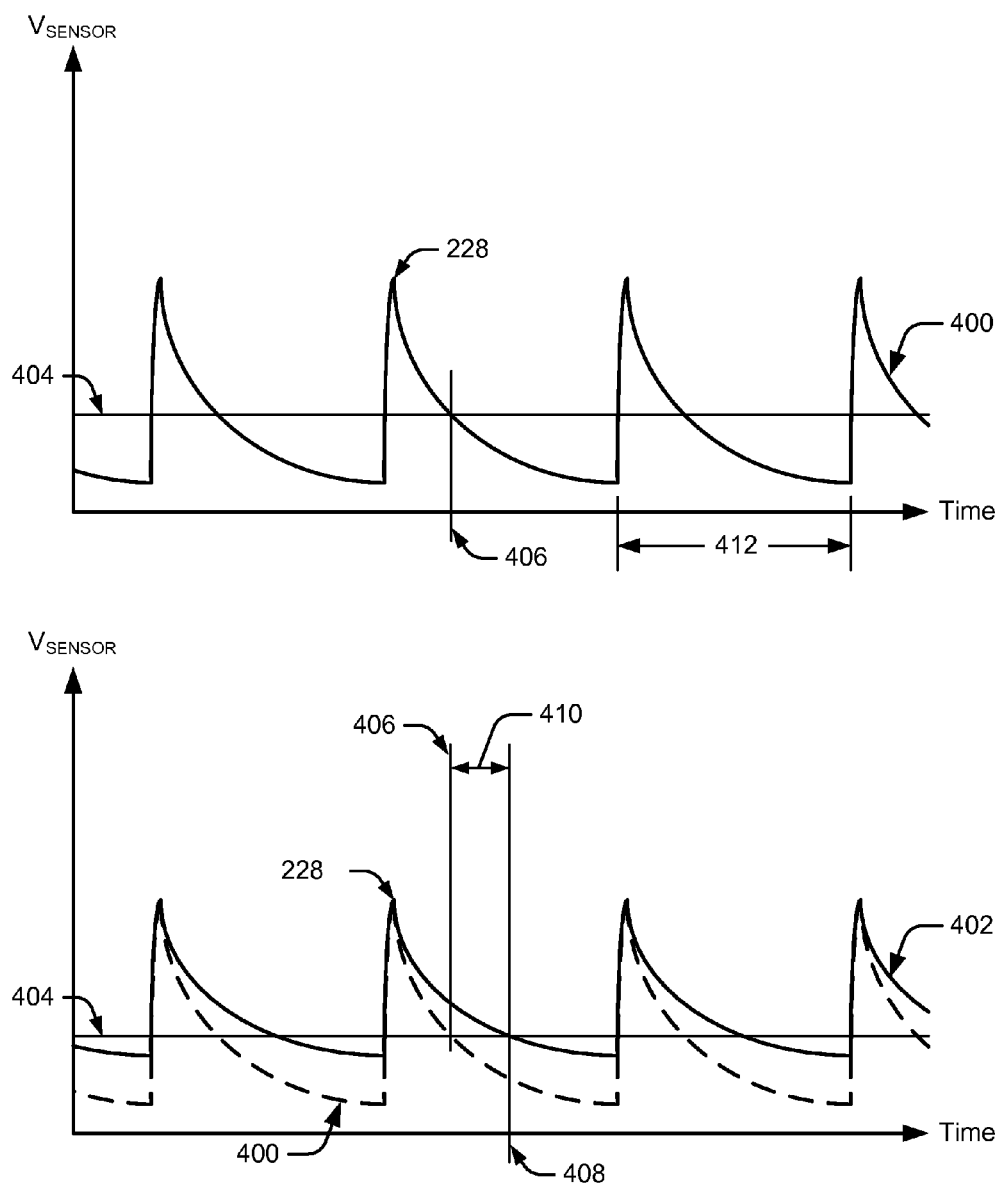
FIG. 4 illustrates example electrical signals associated with a capacitive sense element in accordance with one or more aspects.

As an example, consider touch input processor 124 and touch sensor 122 in the context shown in FIGS. 1 and 2. Assume here that a user is initiating a copy operation by placing a finger on a "Copy" button of multi-function printer 104. Also assume here that the "Copy" button is associated with touch sensor 122. Here, touch input processor 124 executes a first set of instructions from TIP SRAM 126 that drive GPIO 128 port high to $V_{DRIVE}$ 228 for a duration of time (e.g., about 1 microsecond). This causes charge current 230 to flow into capacitive elements 232 and 234, which charges touch sensor 122. As shown in FIG. 4, which illustrates example $V_{SENSOR}$ waveform 400, $V_{SENSOR}$ increases to $V_{DRIVE}$ 228 as touch sensor 122 is charged. Assume that $V_{SENSOR}$ waveform 400 is generated while a user is not touching or interacting with touch sensor 122. For comparative purposes, FIG. 4 also illustrates $V_{SENSOR}$ waveform 402, which also shows $V_{SENSOR}$ increasing to $V_{DRIVE}$ 228 as touch sensor 122 is charged. Assume also that $V_{SENSOR}$ waveform 402 is generated while a user is touching or interacting with touch sensor 122.

At 304, a second set of instructions that monitor a voltage level of the capacitive sense element are executed. This second set of instructions may be executed subsequent to the duration of time during which an output is driven high to charge the capacitive sense element. The second set of instructions may include a time-based instruction that delays execution of a subsequent instruction. The time-based instruction may have a timing parameter defining an amount of time for which execution of the subsequent execution is delayed.

The voltage level may be monitored via an input as the capacitive sense element discharges, such as when current flows through a discharge resistor. In some cases, the input may be a GPIO port that is configured as an input to sense the voltage level. The second set of instructions may be executed for a number of iterations until the voltage level of the capacitive sense element crosses a predefined threshold. A number of iterations that the second set of instructions executes may relate to an amount of time consumed while the voltage level of the capacitive sense element discharges to the predefined threshold. This predefined threshold may be a logic-level low for an input (e.g., a logic level "0").

In the context of the present example, touch input processor 124 executes a second set of instructions from TIP SRAM 126 that monitor $V_{SENSOR}$ of touch sensor 122 via GPIO port 128 as $V_{SENSE}$ 238. Here touch input processor 124 iteratively executes the second set of instructions from TIP SRAM 126 until $V_{SENSOR}$ crosses a logic-level low threshold of GPIO port 128. As shown in FIG. 4, $V_{SENSOR}$ waveform 400 crosses logic-level low threshold 404 at time 406. $V_{SENSOR}$ waveform 402 is also shown in FIG. 4 as crossing logic-level low threshold 404 at time 408. In either case, touch input processor 124 continues to iteratively execute the second set of instructions until $V_{SENSOR}$ crosses a logic-level low threshold 404.

Note here, time difference 410 between times 406 and 408 is shown by an overlay of $V_{SENSOR}$ waveform 400 (illustrated as a dashed line for visual differentiation) and $V_{SENSOR}$ waveform 402. An amount of time consumed while $V_{SENSOR}$ discharges from $V_{DRIVE}$ 228 to logic-level low threshold 404 increases when a user is touching or otherwise interacting with touch sensor 122. This increase in discharge time may be caused by an increase in fringing capacitance due to proximity of a user's finger with touch sensor 122. Accordingly, when a user is touching touch sensor 122 (e.g., touching the "Copy" button), touch input processor 124 executes the second set of instructions for more iterations during this increased discharge time. Alternately, a number of iterations that the second set of instructions execute when a user is not touching touch sensor 122 may be used as a reference value as described below.

At 306, it is determined that a user is interacting with the capacitive sense element. User interaction with the capacitive touch element may not be limited to pressing or pushing, as presence or proximity of a finger may also be sensed. This determination may be based on a number of iterations that the second set of instructions executes until a voltage level of the capacitive touch sensor crosses a predefined threshold. In some cases, the determination may include comparing the number of iterations that the second set of instructions executes to a reference value. This reference value may be determined by performing acts of method 300 when a user is not interacting with the capacitive sense element. Determining the reference value may be initiated in response to a power event, in response to a command received from a higher-level system entity, or initiated at a random time.

Continuing the ongoing example, touch input processor 124 compares the number of iterations that the second set of instructions execute to a reference value. As described with regard to operation 304, this reference value may be based on a number of iterations that the second set of instructions execute when a user is not touching touch sensor 122. Recall that when a user is touching a capacitive sense element, the number of iterations that the second set of instructions execute increases due to an increased discharge time. As such, touch input processor 124 determines that a user is touching the "Copy" button because the number of iterations that the second set of instructions execute is greater than the reference value. The exact voltage value at which Vsense 238 transitions from logic "1" to logic "0" is not critical because the same input may be used to determine the reference value of iterations and for sensing the number of iterations. It can be assumed that the logic threshold for each input sensor remains stable from iteration to iteration. In some cases, periodic re-calculation of the reference value of iterations may account for changes in environmental conditions in which the product is deployed or operating.

From operation 306, method 300 may return to operation 302 or proceed to operation 308. Returning to operation 302, operations 302, 304, and 306 may be repeated to confirm that a user is interacting with a capacitive sense element. Alternately or additionally, operations 302 and 304 may be performed when a user is not interacting with a capacitive sense element to establish the aforementioned reference value of operation 306. For example, touch input processor 124 may run a calibration routine that includes operations 302 and 304 on power-up.

At 308, a user interaction event is signaled to a higher-level system entity. This user interaction event may be signaled in response to determining that a user is interacting with the capacitive sense element. The higher-level system entity may be a system-level microcontroller or an ASSP of a touch input-enabled device. In some cases, the user interaction event is signaled by asserting an interrupt to a system-level microcontroller. In such cases, information associated with the user interaction (e.g., button-press or key-press information) may be written to a shared memory. The system-level microcontroller can then access this information and clear the interrupt when finished.

From operation 308, method 300 may return to operation 302, repeating operations 302, 304, and 306 to detect subsequent user interaction with the capacitive sense element. By way of example, these operations may be repeated cyclically to continually monitor touch sensors 122.

Concluding the present example, touch input processor 124 asserts an interrupt to system μprocessor 112. Touch input processor 124 also writes information to SRAM 118 indicating the "Copy" button has been pushed by a user. Here, system μprocessor 112 initiates a copy process of multi-function printer 104 and clears the interrupt. Touch input processor 124 then returns to executing the first and the second set of instructions from microcode from TIP SRAM 126 to detect subsequent touch input. By so doing, $V_{SENSOR}$ of touch sensor 122 may be iteratively monitored every time interval 412 (e.g., about 40-50 microseconds) to detect touch input.

It should be noted, as described elsewhere in this disclosure, that the methodologies or operations of methodologies of this disclosure may be performed alternatively by monitoring a voltage of a capacitive sense element while charging. For example, a method similar to method 300 could be performed by executing a first set of instructions that drive an output low for a duration of time to discharge a capacitive element to a lower potential (e.g., 0 volts or below a logic-level low threshold of an input). Once discharged for the duration of time, a second set of instructions can be executed iteratively to monitor the voltage level of the capacitive touch sensor as charge current flows into the capacitive touch sensor from a charging resistor. User interaction can then be determined based on a number of iterations that the second set of instructions execute until the voltage of the capacitive touch sensor crosses a predefined threshold while charging (e.g., logic-level high of an input). Thus any aspect described within this disclosure pertaining to methodologies in which voltage of a capacitive sense element is monitored while discharging (e.g. methods 300 and 500) may be equally applied to aspects of the disclosure in which a voltage of a capacitive touch sensor is monitored while charging.

Figure 5:
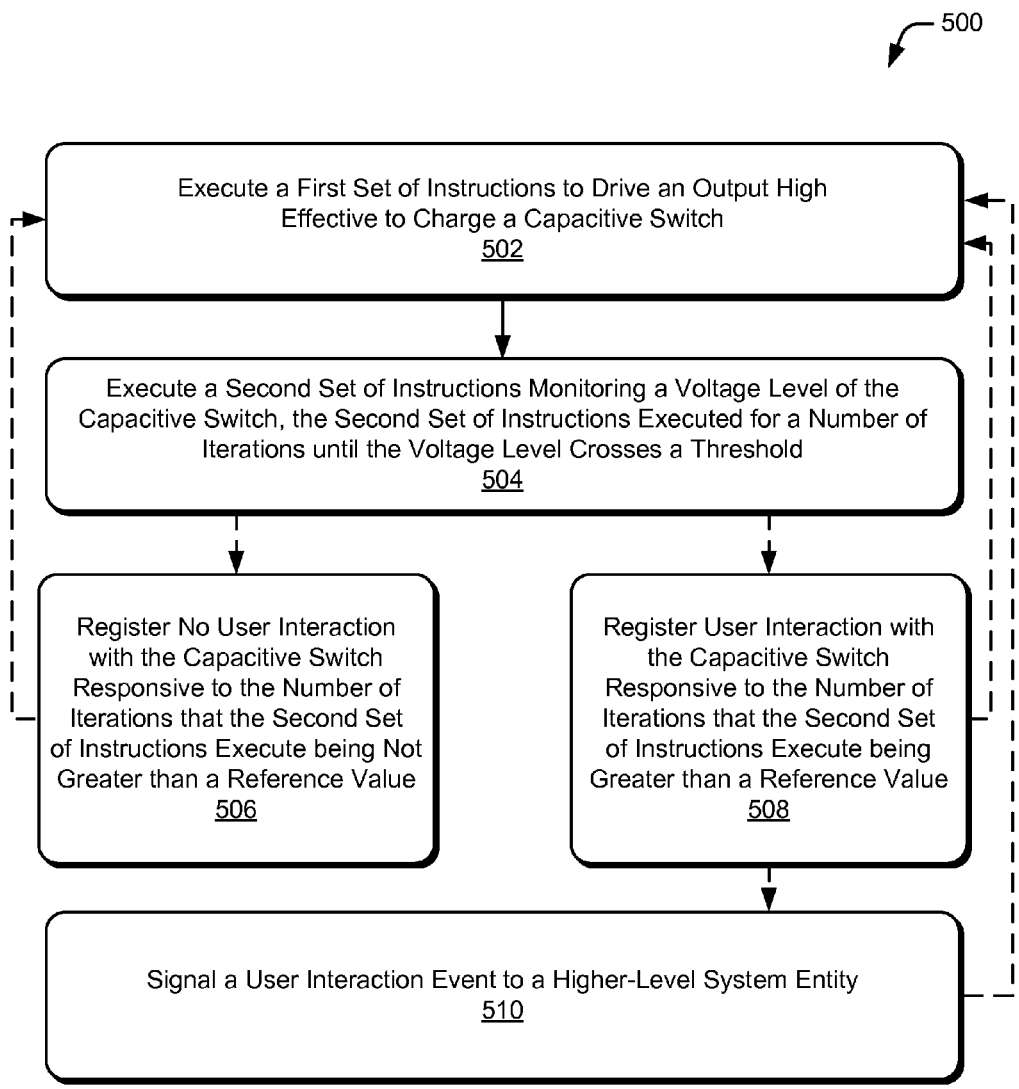
FIG. 5 illustrates a method of registering user interaction with a capacitive switch.

FIG. 5 depicts a method 500 for registering user interaction with a capacitive switch, including operations performed by touch input processor 124 of FIG. 1.

At 502, a first set of instructions to drive an output high is executed effective charge a capacitive switch. This first set of instructions may include a time-based instruction that delays execution of a subsequent instruction. The time-based instruction may have a timing parameter defining an amount of time for which execution of the subsequent execution is delayed. In some cases, the output is driven to a logic-level high level, such as 3.3 volts or 5 volts. By so doing, current may be driven into the capacitive switch having a lower potential.

As another example, again consider touch input processor 124 and touch sensor 122 in the context shown in FIGS. 1 and 2. Assume here that a user is attempting to initiate playback of a media file by touching touch sensor 122 of set-top box 106.

Here, touch input processor 124 executes a first set of instructions to drive an output high effective to charge touch sensor 122.

At 504, a second set of instructions monitoring a voltage level of the capacitive switch are executed. The second set of instructions may include a time-based instruction that delays execution of a subsequent instruction. A timing parameter of the time-based instruction may define an amount of time for which execution of the subsequent execution is delayed. The voltage level may be monitored via an input as the capacitive switch discharges, such as when current flows through a discharge resistor.

The second set of instructions may be executed for a number of iterations until the voltage level of the capacitive switch crosses a predefined threshold. A number of iterations that the second set of instructions executes may relate to an amount of time consumed while the voltage level of the capacitive switch discharges to the predefined threshold. This predefined threshold may be a logic-level low for an input (e.g., a logic level "0").

In some cases, the second set of instructions may be a loop of instructions having an associated loop-count value that is incremented each time the loop executes. In such cases, a loop-count value may be higher when a voltage level of a capacitive switch takes longer to discharge. Alternately or additionally, an amount of time consumed by executing the loop of instructions may be the same regardless of whether a user is touching or not touching the capacitive switch.

In the context of the present example, touch input processor 124 resets a loop-count associated with the second set of instructions and begins executing the second set of instructions as a loop to monitor a voltage of touch sensor 122. Touch input processor 124 then executes the loop of the second set of instructions until the voltage of touch sensor 122 crosses a predefined threshold (e.g., a logic-level low of an input). Each time the loop of the second set of instructions is executed, touch input processor increments the loop-count.

From operation 504, method 500 may proceed to operation 506 or operation 508, depending on a number of iterations that the second set of instructions executes.

At 506, no user interaction with the capacitive switch is registered in response to the number of iterations that the second set of instructions executes not being greater than a reference value. This reference value may be determined by performing operations 502 and 504 of method 500 when a user is not touching the capacitive switch. Determining the reference value may be initiated in response to a power event, in response to a command received from a higher-level system entity, or initiated at a random time. From operation 506, method 500 may return to operation 502 to attempt to detect subsequent touch input from the capacitive switch.

At 508, user interaction with the capacitive switch is registered in response to the number of iterations that the second set of instructions executes being greater than the reference value. In some cases, a bias value is subtracted from the number of iterations that the second set of instructions executes. This biased number of iterations can then be compared to the reference value. This bias value may be configured such that an increase of about 50% in the number of iterations that the second set of instructions executes over a calibration value would register user interaction. In such cases, an offset may also be added to the biased number to ensure a positive comparison.

Continuing the ongoing example, touch input processor 124 compares the loop-count associated with the second set of instructions with a reference loop-count value. Assume here that the reference loop-count value for touch sensor 122 was established by performing operations 502 and 504 when a user was not touching touch sensor 122. Here, touch input processor 124 registers user interaction as the loop-count associated with touch sensor 122 exceeds the reference loop-count value.

From operation 508, method 500 may return to operation 502 or proceed to operation 510. Returning to operation 502, operations 502 and 504 may be repeated to confirm that a user is pressing the capacitive switch. In some cases, repeating operations 502 and 504 may be effective to provide a de-bounce functionality for the capacitive switch. In such cases, operations 502 and 504 may be repeated, such as about 10 times, to effectively de-bounce input received from a capacitive switch.

At 510, a user interaction event is signaled to a higher-level system entity. This user interaction event may be signaled in response to registering user is interaction with the capacitive switch. The higher-level system entity may be a system-level microcontroller or an ASSP of a touch input-enabled device. In some cases, the user interaction event is signaled by asserting an interrupt to a system-level microcontroller. In such cases, information associated with the user interaction (e.g., button press or key press information) may be written to a shared memory. The system-level microcontroller can then access this information and clear the interrupt when finished.

From operation 510, method 500 may return to operation 502, repeating operations 502, 504, 506, or 508 to detect subsequent touch input at the capacitive switch.

Concluding the present example, touch input processor 124 interrupts system μprocessor 112. Touch input processor 124 also stores information to SRAM 118 indicating that touch sensor 122 is being touched by the user. Here, system μprocessor 112 initiates playback of media stored on set-top box 106 and clears the interrupt. Touch input processor 124 then returns to executing the first and the second set of instructions from microcode from TIP SRAM 126 to detect subsequent touch input.

System-on-Chip

Figure 6:
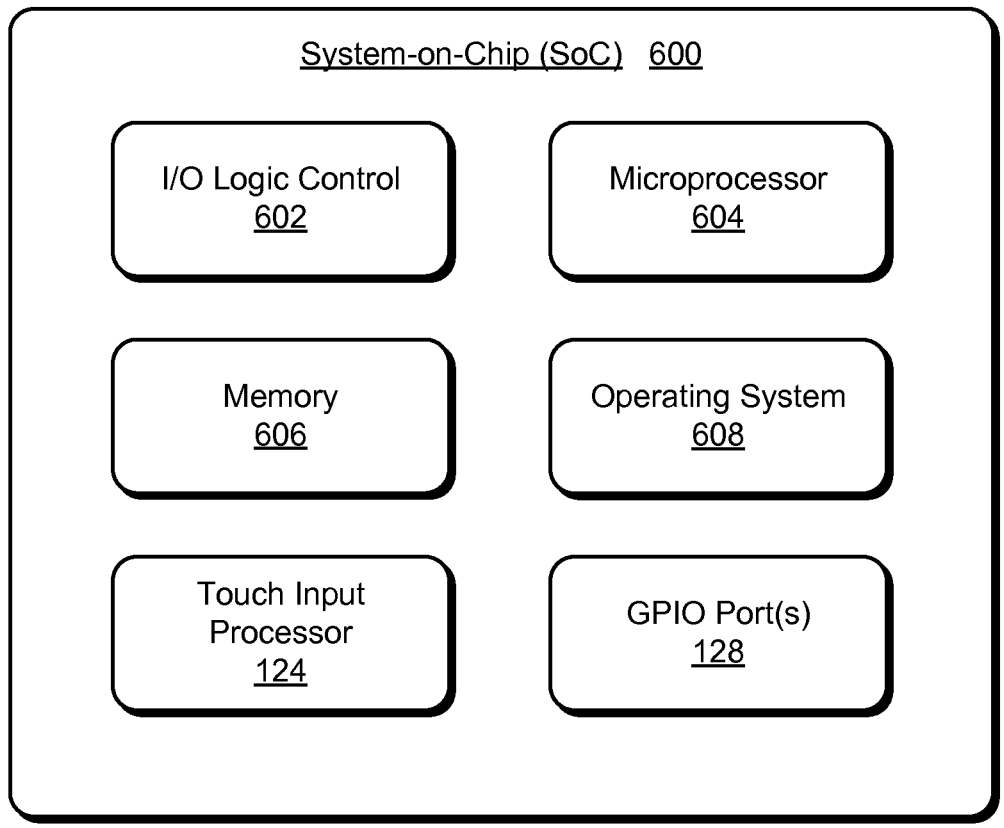
FIG. 6 illustrates a System-on-Chip (SoC) environment for implementing aspects of the techniques described herein.

FIG. 6 illustrates a System-on-Chip (SoC) 600, which can implement various embodiments described above. A SoC can be implemented in any suitable computing or electronic device such as a printer, set-top box, television, game console, photo printer, fax machine, multifunction print device, and/or any other type of device that may implement capacitive or other touch input technologies (e.g., resistive, mechanical, piezoelectric, and so on).

SoC 600 can be integrated with electronic circuitry, a microprocessor, memory, input-output (I/O) logic control, communication interfaces and components, other hardware, firmware, and/or software needed to run an entire device. SoC 600 can also include an integrated data bus (not shown) that couples the various components of the SoC for data communication between the components. A wireless communication device that includes SoC 600 can also be implemented with many combinations of differing components.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, non-volatile RAM (NVRAM), SRAM (e.g., TIP SRAM 126), low-latency nonvolatile memory (e.g., flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes touch input processor 124 and GPIO port(s) 128 (embodied as disparate or combined components as noted above). Examples of these various components, functions, and/or entities, and their corresponding functionality, are described with reference to the respective components of the environment 100 shown in FIG. 1 and FIG. 2.

Touch input processor 124 in SoC 600, either independently or in combination with other entities, can be implemented as computer-executable instructions maintained by memory 606 and executed by microprocessor 604 to implement various embodiments and/or features described herein. Touch input processor 124 may also be provided integral with other entities of the SoC, such as integrated with one or both of I/O logic controller 602 or GPIO port(s) 128. Alternatively or additionally, touch input processor 124 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method for determining whether a user is interacting with a capacitive sense element, the method comprising:
    executing a first set of instructions that drive, for a duration of time, an output to a predetermined state effective to charge the capacitive sense element;
    subsequent to the output being driven for the duration of time effective to charge the capacitive sense element, executing a second set of instructions that monitor, via an input, a voltage level of the capacitive sense element as the charge on the capacitive sense element changes, wherein the second set of instructions are executed for a number of iterations until the voltage level of the capacitive sense element, as monitored via the input, crosses a predefined threshold;
    subtracting a bias value from the number of iterations that the second set of instructions execute to provide a biased number of iterations;
    adding an offset to the biased number of iterations that the second set of instructions execute to ensure a positive comparison; and
    determining whether the user is interacting with the capacitive sense element by comparing the offset number of iterations that the second set of instructions execute with a reference value that indicates user interaction when met or exceeded.

2. The method of claim 1, wherein the first set of instructions includes at least one time-based instruction having a timing parameter, the timing parameter delaying execution of a subsequent instruction in the first set of instructions for an amount of time.

3. The method of claim 1, wherein the second set of instructions includes at least one time-based instruction having a timing parameter, the timing parameter delaying execution of a subsequent instruction in the second set of instructions for an amount of time.

4. The method of claim 1, further comprising repeating the method of claim 1 to confirm whether the user is interacting with the capacitive sense element.

5. The method of claim 1, further comprising determining the reference value by performing the method of claim 1 when a user is not interacting with the capacitive sense element.

6. The method of claim 5, further comprising determining the reference value in response to a power event, in response to a command from a higher-level system entity, or at a random time.

7. The method of claim 1, wherein the predefined threshold is a logic-level low threshold for the input.

8. The method of claim 1, further comprising, in response to determining that a user is interacting with the capacitive sense element, signaling a user interaction event to a higher-level system entity.

9. The method of claim 1, further comprising:
    registering no user interaction with the capacitive sense element responsive to the offset number of iterations that the second set of instructions execute not being greater than the reference value; or
    registering user interaction with the capacitive sense element responsive to the offset number of iterations that the second set of instructions execute being equal to or greater than the reference value.

10. The method of claim 1, wherein execution of the second set of instructions for the number of iterations until the voltage level of the capacitive sense element crosses the threshold consumes about 40 to 50 microseconds of time.

11. The method of claim 1, wherein the duration of time for which the output is driven high is about 1 microsecond.

12. The method of claim 1, wherein the capacitive switch element comprises a capacitive touch switch.

13. The method of claim 1, wherein the input and the output are provided by a configurable general purpose input output port.

14. A system-on-chip comprising:
    an output port operably coupled to a capacitive sense element;
    an input port operably coupled to the capacitive sense element; and
    a touch input processor configured to:
        execute a first set of instructions that drive, for a duration of time, the output port to a predetermined state effective to charge the capacitive sense element,
        subsequent to the output port being driven for the duration of time effective to charge the capacitive sense element, execute a second set of instructions that monitor, via the input port, a voltage level of the capacitive sense element as the charge on the capacitive sense element changes, wherein the second set of instructions are executed for a number of iterations until the voltage level of the capacitive sense element, as monitored via the input port, crosses a predefined threshold,
        subtract a bias value from the number of iterations that the second set of instructions execute to provide a biased number of iterations,
        add an offset to the biased number of iterations that the second set of instructions execute to ensure a positive comparison, and
        determine whether a user is interacting with the capacitive sense element by comparing the offset number of iterations that the second set of instructions execute with a reference value that indicates user interaction when met or exceeded.

15. The system-on-chip of claim 14, wherein the predefined threshold is a logic-level low threshold for the input port of the system-on-chip.

16. The system-on-chip of claim 14, wherein the touch input processor is further configured to, in response to determining that the user is interacting with the capacitive sense element, signal a user interaction event to a higher-level system entity within the system-on-chip.

17. The system-on-chip of claim 14, wherein the ports of the system-on-chip are configured as a general purpose input/output (GPIO) port.

18. The system-on-chip of claim 17, wherein the first set of instructions further configure the GPIO port as the output port to be driven and, subsequent the output port being driven the duration of time, configure the GPIO port as the input port to sense the voltage level.

19. The system-on-chip of claim 17, wherein the touch input processor is further configured to repeat the acts of executing the first set of instructions, executing the second set of instructions, subtracting the bias value, adding the offset, and determining whether the user is interacting with the capacitive sense element to confirm that the user is interacting with the capacitive sense element.

20. The system-on-chip of claim 14, wherein the touch input processor is further configured to execute, when a user is not interacting with the capacitive sense element, the first set of instructions and the second set of instructions to determine the reference value for comparison.

* * * * *